(12) United States Patent
Stuber et al.

(10) Patent No.: US 6,910,087 B2
(45) Date of Patent: Jun. 21, 2005

(54) DYNAMIC COMMAND BUFFER FOR A SLAVE DEVICE ON A DATA BUS

(75) Inventors: Russell B. Stuber, Boulder, CO (US); Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 374 days.

(21) Appl. No.: 10/165,921

(22) Filed: Jun. 10, 2002

(65) Prior Publication Data

US 2003/0229741 A1 Dec. 11, 2003

(51) Int. Cl.$^7$ .......................... G06F 13/00; G06F 13/14; G06F 13/28; G06F 13/42
(52) U.S. Cl. .......................... 710/110; 710/35; 710/106; 711/167
(58) Field of Search .......................... 710/5, 20, 33–35, 710/51, 100, 106, 110; 711/167; 712/31, 218

(56) References Cited

U.S. PATENT DOCUMENTS

| | | | | |
|---|---|---|---|---|
| 4,710,927 A | * | 12/1987 | Miller | 714/724 |
| 5,132,680 A | | 7/1992 | Tezuka et al. | |
| 5,406,554 A | * | 4/1995 | Parry | 370/381 |
| 5,598,483 A | * | 1/1997 | Purcell et al. | 382/232 |
| 5,655,105 A | * | 8/1997 | McLaury | 711/169 |
| 5,796,413 A | * | 8/1998 | Shipp et al. | 345/522 |
| 5,845,100 A | * | 12/1998 | Gupta et al. | 712/204 |
| 5,896,516 A | * | 4/1999 | Powell et al. | 710/317 |
| 6,005,502 A | * | 12/1999 | Costa et al. | 341/65 |
| 6,147,926 A | * | 11/2000 | Park | 365/233 |
| 6,345,334 B1 | * | 2/2002 | Nakagawa et al. | 711/104 |
| 6,559,852 B1 | * | 5/2003 | Ashburn et al. | 345/533 |

FOREIGN PATENT DOCUMENTS

| | | | | |
|---|---|---|---|---|
| JP | 10093572 A | * | 4/1998 | H04L/12/28 |
| JP | 11203860 A | * | 7/1999 | G11C/11/407 |

OTHER PUBLICATIONS

"NSBMC096–16/–25/–33 Burst Memory Controller" Datasheet. National Semiconductor Corporation. Aug.–1993.*

"AMBA™ Specification (Rev. 2.0)", ARM Limited, Cambridge, England, pp. ii–vi and 3–1—3–58 (May 13, 1999).

* cited by examiner

Primary Examiner—Mark H. Rinehart
Assistant Examiner—Thomas J. Cleary
(74) Attorney, Agent, or Firm—Westman, Champlin & Kelly

(57) ABSTRACT

A slave device includes a command FIFO that stores commands for a device controller on a first-in, first-out basis to execute a read or write transaction. Commands are received from the data bus by an input register which supplies write commands to a dynamic stage register. A multiplexer couples the dynamic stage register and the input register to the command FIFO so that only the initial command of a single or multi-beat write burst is written to the command FIFO from the dynamic stage register. Consequently, separate write commands are not stored for each data beat, resulting in minimal areal size for the integrated circuit chip containing the command FIFO. Instead, a counter counts the number of beats in the multi-beat burst, so that when the last beat is received, the initial command and the beat count are supplied to the command FIFO. The device controller calculates the starting address of each subsequent data beat based on the prior beat address and the size of the data beat, to a limit established by the beat count. Non-queued read commands are transferred by the multiplexer directly from the input register to the command FIFO so that latency is not added to the processing of read commands.

20 Claims, 2 Drawing Sheets

DYNAMIC COMMAND BUFFER FOR A SLAVE DEVICE ON A DATA BUS

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between master devices, such as user-controlled microprocessors, and slave devices controlling peripheral devices, such as memories or the like. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

The AHB bus is a pipelined bus that operates in two phases, a command phase followed by a data transfer phase. The master device instructs, or commands, the slave device during the command phase to perform a specific type of data transaction, and the slave device transfers data with the master device during the data transfer phase. For example, a read command will command the slave to read data from its storage device during the command phase and transfer that data to the master device via the bus during the data transfer phase.

The operating frequency of the peripheral device is not always the same as that of the data bus and slave device. Consequently, the slave device ordinarily includes first-in, first-out (FIFO) registers that buffer commands and data across the frequency barrier. The commands are received by an input register which supplies commands to an input command FIFO, which in turn supplies commands to the device controller of the peripheral device.

FIFOs embodied in ICs require a considerable amount of chip area; the physical size of the FIFO is proportional to the maximum number and size of words held by the FIFO. To minimize the size of the FIFO, and hence the chip size, it is desirable to minimize the maximum number of words to be held by the FIFO. In the case of the input command FIFO, it is desirable to minimize the number of commands held by the FIFO.

In a read operation, the device controller will pull the read command from the command FIFO and execute the command. Consequently, a large command FIFO is not required for read operations. However, in a write operation, the data being written may be voluminous, extending over several data beats (cycles). The device controller pulls the write command from the command FIFO to write each beat of write date to the memory or other device.

In the AHB bus, a write command, which includes an address of the peripheral device to which data are to be written, is associated with each beat of data in a multi-beat write data transfer. The slave device inserts each write command into the command FIFO. Consequently, the command FIFO must contain a number of commands corresponding to the number of beats of write data. If the data burst contains four beats of data, the command FIFO holds four commands; if the data burst contains sixteen beats, the command FIFO holds sixteen commands. However, this solution requires a large command FIFO to accommodate the multiple write commands, which requires a considerable amount of area on the integrated chip.

SUMMARY OF THE INVENTION

The present invention is directed to a dynamic stage system for the slave device of a data bus that retains a write command for insertion into the command FIFO for each beat of write data, yet inserts non-queued read commands directly into the command FIFO. Consequently, the size of the command FIFO can be minimized without introducing latency to the read commands.

In one embodiment of the invention, a slave device on an integrated circuit chip feeds a device controller. A command FIFO stores and issues commands for the device controller on a first-in, first-out basis for execution of a read or write transaction. An input register receives commands from the data bus. The command identifies the type of transaction (read or write) to be performed. A slave control operates a dynamic stage register to store at least the write commands from the input register. A multiplexer couples the dynamic stage register to the command FIFO to supply at least the write commands from the dynamic stage register to the command FIFO and couples the input register to the command FIFO to supply read commands from the input register to the command FIFO. The slave control also includes a counter that counts the number of beats of data in a write transfer. In a write transfer operation, the slave control operates the multiplexer to write the initial write command to the command FIFO. The slave control also transfers the beat count to the command FIFO. The device controller pulls the initial write command from the command FIFO for the first data beat and calculates the storage addresses for subsequent beats from the prior address and the beat size. Consequently, the command FIFO needs to hold only the initial write command for the entire data burst, thereby minimizing the areal size necessary for the command FIFO.

DETAILED DESCRIPTION OF THE PREFERRED EMBODIMENTS

Figure 1:
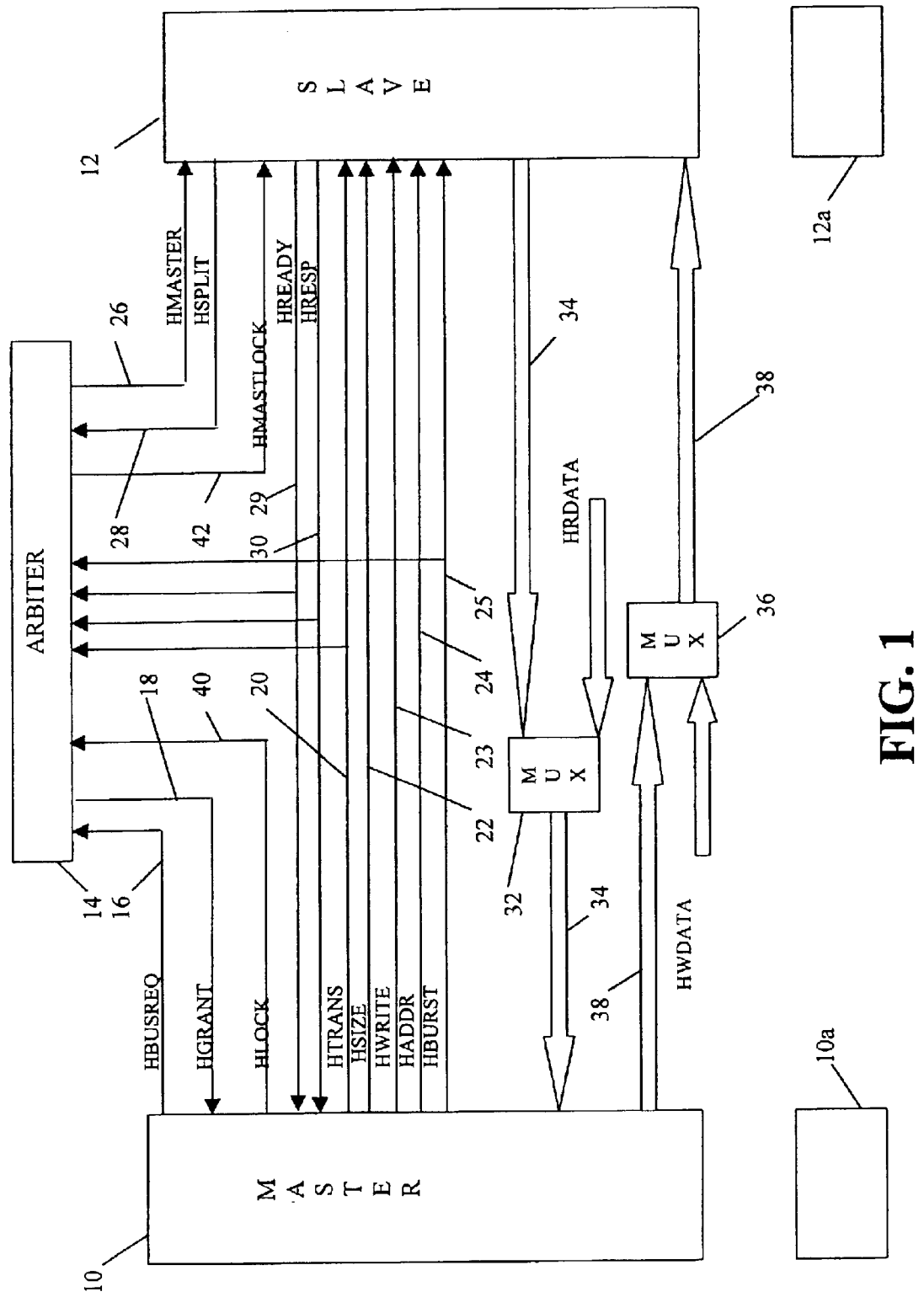
FIG. 1 is a block diagram of portions of a bus, incorporating the dynamic write command buffer according to the present invention.

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in *AMBA Specification* published by ARM Limited of Cambridge, England (1999), and particularly Chapter 3 thereof (pp. 3–1 to 3–58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

One feature of the bus illustrated in FIG. 1 resides in the transfer of data, and particularly the use of data packages in the form of bursts of selected lengths. Each burst contains a plurality of beats of data for transfer and a burst identification signal that identifies the number of beats and contains aspects of the address structure of the location of data for each beat.

Another feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices.

Another feature of the bus illustrated in FIG. 1 is that the master device 10 may assert an HLOCK signal on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK signal on bus 42 to slave device 12. The slave device responds to the signal on bus 42 to process all locked transfers before any other master device is granted access to the bus.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23, an HADDR signal via bus 24, and a HBURST signal via bus 25. The HTRANS and HBURST signals are also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); the HBURST signal is a 3-bit code identifying the number (or range) of beats (or bus cycles) of a data transfer and whether the beats are wrapped or incremental; and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. An OKAY response (HRESP=(0,0) and HREADY=1) indicates that the previous command has been completed, for example that the write command and data transfer was accepted by the slave device or that read data are available on the HRDATA bus 34. The slave device may hold HREADY low (HREADY=0) as long as it desires, but arbiter 14 cannot permit any bus traffic as long as HREADY is low, and the results of the prior transfer may not be known.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed. If the slave device decides it is not ready to handle the transaction, it may issue a SPLIT response on HREADY bus 30 and HRESP bus 29 to mask the master device from the bus and idle the bus. Later, when the slave device becomes free to accept a command, it asserts a bit on HSPLIT bus 28 to unmask the split master device.

As shown in FIG. 1 actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred. Write data on bus 38 passes through multiplexer 36 to slave device 12.

A burst operation is controlled by the HBURST signal on line 25. In the AHB bus, the HBURST signal is a 3-bit code identifying the size of the burst and whether the burst is an incrementing or wrapping burst. The burst size may be single length (0,0,0), unspecified length (0,0,1), or in four- (0,1,X), eight- (1,0,X) or sixteen-beat (1,1,X) bursts. Incremented bursts (X=1) access sequential locations in the peripheral device and the address of each transfer in the burst is an increment of the previous address. Thus, if a four-beat incremental burst starts with address 0x38 (in hexadecimal) the address sequence of the four beats is 0x38, 0x3C, 0x40, 0x44. Wrapping bursts (X=0) wrap the address at the address boundaries. Thus, if a four-beat wrapping burst that wraps at 16-byte boundaries starts with address 0x38, the address sequence is 0x38, 0x3C, 0x30, 0x34.

The slave device includes separate data FIFOs that transfer data between the data bus 34 or 38 and the peripheral device operated by the device controller and a command FIFO. The separation of the data FIFOs from the command FIFO permits a reduction of chip size. As noted above, the read and write transactions are two-phase operations, consisting of a command phase and a data transfer phase. In a read operation, the command phase initiates retrieval of data from the peripheral device; the retrieved data are returned to the read data FIFO. Upon return of the data, the slave device either transfers the data to the requesting master device (in the case where the slave device had not split the transaction), or (in the case of a split transaction) it indicates that it is ready to transfer the data, which occurs after the master device re-issues the command. In either case, there is no need to further buffer the read command because the data have already been retrieved from the peripheral device during the data transfer phase and are in the read data FIFO ready for transfer.

Some write commands may be associated with data bursts having plural beats. More particularly, during the data transfer phase, the data burst might contain 4, 8 or 16 beats of data, requiring 4, 8 or 16 bus cycles to transfer to the write data FIFO. The write command is received for each beat or cycle. The write commands in command FIFO are made ready to be pulled out by the device controller after all beats of data have been received. However, the time of arrival of the last beat of data cannot be predicted (such as from the HBURST signal) due to data transfer delays, burst terminations, mid-burst full conditions and the like. Consequently, prior command FIFOs were simply large enough to hold maximal numbers of commands to meet data transfer expectations in write operations, notwithstanding the large size required for the command FIFOs.

The present invention is directed to a dynamic buffer by which the command bus is "de-pipelined" for write commands so that the write command is written once into the command FIFO. Non-queued read commands are pipelined directly to the command FIFO. Consequently, the number of commands queued in the command FIFO is minimized, so the area required for the command FIFO is also minimized, without affecting latency of read operations.

Figure 2:
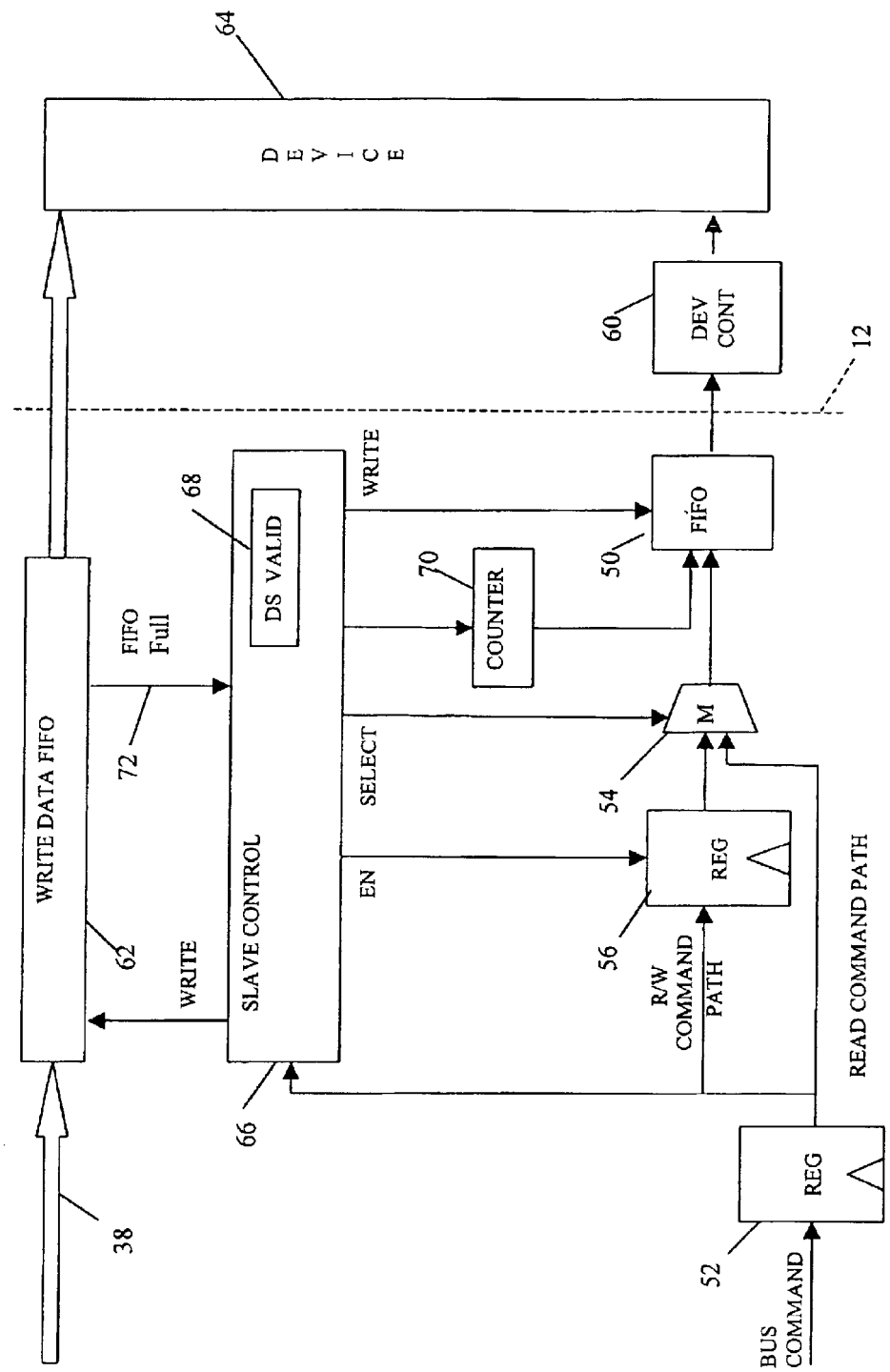
FIG. 2 is a functional block diagram of the input portion of a slave device for use in the bus illustrated in FIG. 1, illustrating the principles of the dynamic write command buffer of the present invention.

FIG. 2 is a functional block diagram of a portion of the command input section of a slave device 12 in accordance with the present invention. Command FIFO 50 supplies commands to device controller 60 on a first-in, first-out basis. The clock speed of device controller 60 is often different from that of FIFO 50, so FIFO 50 also serves to transfer commands across the frequency barrier. Commands to be executed are transferred from FIFO 50 to device controller 60.

Commands are received from the command bus by input register 52, operating at the same clock speed as the bus, write data FIFO 62 and command FIFO 50. Register 52 is capable of receiving the next command during the same time that command FIFO 50 is transferring the current command to device controller 60. In the embodiment of the AHB bus, the command bus comprises lines 20, 22, 23, 24, 25 and 26 (FIG. 1).

Input register 52 supplies at least the HADDR, HBURST, HSIZE and HTRANS portions of the command to an input port of both dynamic stage register 56 and multiplexer 54. Register 52 also supplies at least the HBURST and HWRITE codes to slave control 66, which in turn selectively provides an enable signal to dynamic stage register 56 and a select signal to multiplexer 54. The command from input register 52 is stored in dynamic stage register 56 in response to the enable signal from slave control 66. Multiplexer 54 is responsive to the select signal from slave control 66 to transfer a command to command FIFO 50 from either dynamic stage register 56 or from input register 52.

Slave control 66 includes a dynamic stage validity register 68 containing a bit indicating the validity of the command in dynamic stage register 56. Slave control 66 also operates to increment or reset a count in counter 70.

In operation of the apparatus, each command includes a 2-bit HTRANS code indicative of a transfer type (idle, busy, non-sequential, or sequential). A NONSEQ code indicates that the transfer type is non-sequential and is used to indicate that the transfer is the first beat of a burst containing plural beats or is a single beat transfer. In either case, the NONSEQ code indicates that the address and control signals associated with the command are unrelated to the previous transfer. A SEQ code indicates that the transfer is sequential and that the transfer is related to the previous transfer, such as the second or subsequent beat of a multi-beat burst. The address of the SEQ code transfer is equal to the address of the previous transfer plus the size (in bytes) of the data beat. If the burst is a wrapping burst, the address of the transfer wraps at the address boundary.

Assume register 56 contains no current command (or that any command in register 56 is not valid), that counter 70 contains a zero count, and that the dynamic stage bit in register 68 is low, indicating that the command in register 56 is invalid (e.g., DS =0). (Of course, in the alternative a high bit may indicate an invalid command in register 56.) Upon receipt of a write command addressed to slave 12 by input register 52 for the first of one or more beats of data to be written to peripheral device 64 (HWRITE =1 and HTRANS=NONSEQ), the HWRITE and HTRANS signals are supplied to slave control 66 to validate the dynamic stage bit in register 68.

Upon receipt of a write command, slave control 66 provides a write enable bit to write data FIFO 62 to permit the associated beat of data to be written into FIFO 62. Additionally, slave control 66 increments the count in counter 70 by one. Slave control 66 also provides an enable signal to dynamic stage register 56. With register 56 enabled, the command in input register 52 is transferred to register 56.

If the write operation is a single-beat write, the command of the next burst will indicate a transfer type of either non-sequential or idle (HTRANS=NONSEQ or HTRANS= IDLE). Receipt of a non-sequential or idle transfer type operates slave control 66 to provide a select signal to multiplexer 54 to select the write command from register 56 and to write the count stored in counter 70 to command FIFO 50 as an additional field. As a result, the write command in register 56 is copied to command FIFO 50 so that device controller can pull the write command from command FIFO 50 for one beat of data transfer from write data FIFO 62. The data in data FIFO 62 are written into the peripheral device 64 at the address specified in the command. The NONSEQ or IDLE transfer type received by slave control 66 will also reset the count in counter 70. The DS bit in register 68 will also be invalidated if the command type is IDLE or the HWRITE bit indicates that the next operation is a read.

In the case of a multi-beat write burst, each subsequent command (HTRANS=SEQ) received by slave control 66 increments the count in counter 70 and supplies a write enable bit to write data FIFO 62 so that the associated beat of data is stored to FIFO 62. Because dynamic stage register 68 contains a DS bit indicating that register 56 contains a valid command, dynamic stage register 56 is not enabled, and the command is not copied to register 56. Instead, the original command of the first beat remains stored in register 56 and indicated as valid by register 68.

When all beats of data of the multi-beat write burst are written into FIFO 62, and a corresponding count is recorded in counter 70, the next burst transfer type of NONSEQ or IDLE operates slave control 66 to provide two signals: A select signal is supplied to multiplexer 54 causing the multiplexer to transfer the command in dynamic stage register 56 to command FIFO 50. A count signal is supplied from counter 70 to command FIFO 50 as a new field to the command. A write enable signal is also supplied to command FIFO 50 to permit storage of the command and count. Upon transfer of the first beat of data to device 64, device controller 60 pulls the initial command from FIFO 50. As each beat of data is transferred from data FIFO 62 to device 64, device controller 60 calculates a storage address within device 64 for the data based on the prior address, the size of the data beat, and whether the address is to be written to an incremented or wrapped address, as previously described.

By way of example, assume that a write operation is to be performed to write eight beats of data. Eight write commands are received by slave device 12, each accompanied by a beat of data. The first write command includes a HTRANS=NONSEQ code and the next seven commands include a HTRANS=SEQ code. The first received command is written into dynamic stage register 56, and the next seven commands are ignored. As each subsequent command is received by slave control 66 (and its associated beat of data is received by write data FIFO 62), counter 70 is incremented. With the next burst, the transfer code will be either NONSEQ or IDLE. Consequently, slave control 66 enables multiplexer 54 to copy the command in register 56 to command FIFO 50 and add the beat count in counter 70 to FIFO 50 as an additional field. Device controller 60 will pull the initial command and beat count from FIFO 50 and will calculate the correct address for storing the each beat of data based on the address of the prior beat and the size of each beat, to the limit established by the count in the beat count field. More particularly, the first data beat is stored beginning at the address specified in the initial command. At the second data beat, device controller 60 computes a new starting address from the prior (initial) address plus the size of the data beat. Each subsequent data beat is stored beginning at an address based on the address calculated for the prior beat plus the size of the beat. The beat count from counter 70 identifies the number of address calculations to be performed by device controller 60 to store all beats of data.

Upon completion of the write operation, if a new NONSEQ write command is received by input register 52, slave control 66 resets counter 70 and enables dynamic stage register 56 to receive the new command. The valid state of the dynamic stage bit in register 68 is set to valid or remains valid (if it had been valid), and a beat of data is written to data FIFO 62.

The structure of the AHB bus allows a read command to follow the last beat of a write transaction. In this case, if the read data have not been returned to the read data FIFO, an enable signal is issued by slave control 66 to dynamic stage register 56 to store the read command in register 56, thereby queuing the read command behind the write command being processed. A write enable applied to command FIFO 50 and a select applied to multiplexer 54 enables FIFO 50 to store the command from register 56. The read command is processed through dynamic stage register 56 to preserve the read command. Thus, if the read transaction is split, the read command will be written from register 56 to command FIFO 50 during the second cycle of the split operation and the bit in dynamic stage validity bit 68 is invalidated.

If the dynamic stage bit is invalid and the read data have not been returned to the read data FIFO, a read command will operate slave control 66 to supply a select signal to multiplexer 54 to directly write the read command from input register 52 to command FIFO 50. Consequently, the transfer of the read command bypasses the dynamic stage register and is performed with minimal latency.

Upon a read return transaction or upon an idle command on the bus, if the dynamic stage bit in register 68 is valid, slave control 66 operates multiplexer 54 to transfer the command in register 56 to command FIFO 50. Slave control 66 thereupon invalidates the dynamic stage bit. If the dynamic stage bit in register 68 is already invalid, nothing happens, since the data had already been transferred as described above, or the bit is already invalid (in the case of an idle command).

It will be appreciated that an idle, split or read return command will invalidate the dynamic stage bit. This feature is useful in the case of a mid-burst full or a burst termination condition.

The dynamic stage structure is not affected by burst terminations or delays caused by a mid-burst full condition of write data FIFO 62. If write data FIFO 62 becomes full during transfer of a burst, a mid-burst full condition occurs. In this case, data FIFO 62 issues a FIFO full flag 72 to slave control 66, which in turn issues a split HRESP signal to arbiter 14 and the issuing master device 10 to split the data transfer (see FIG. 1)/Slave control 66 operates multiplexer 54 and command FIFO 50 to write the command from register 56 and beat count from counter 70 to command FIFO 50. Thereafter, device controller 60 can operate device 64 to pull data from data FIFO 62. When data FIFO 62 is no longer full, slave control 66 provides an HSPLIT signal to arbiter 14 (FIG. 1) to permit the arbiter to re-arbitrate the split master device. Upon re-arbitration, the master device starts where it left off, with a reconstructed command and burst sequence. The slave control 66 treats the reconstructed command and burst as a new command.

A burst termination occurs where a master device loses use of the bus during a burst transfer. Slave control 66 receives the next command to operate multiplexer 54 and FIFO 50 to transfer the write command from register 56 and beat count from counter 70 as previously described, allowing device controller 60 to operate device 64 to pull beats of data from data FIFO 62. When the master device re-gains use of the bus, operation of the dynamic buffer resumes in the same manner as in the case of the mid-burst full condition. Hence, dynamic stage register 56 assures that the write command will be present for the last beat of data transfer. Therefore, the dynamic stage register is immune from events associated with burst termination and mid-burst full conditions of data FIFO 62.

The present invention thus provides a dynamic write command buffer comprising multiplexer 54 and dynamic stage register 56 for the slave device of a data bus that retains write commands for insertion into the command FIFO. Read commands are written directly into the command FIFO, without introduction of latency. Consequently, the size of the command FIFO can be minimized without introducing latency to the read commands. While the invention is described as a slave device containing command FIFO 50, it will be appreciated by those skilled in the art that the command FIFO may be embodied as a separate unit.

When applied to existing AHB bus designs, the existing controls and commands may be employed and do not need to be changed. The slave device 12 will need to be modified to accommodate the architecture described herein, including the addition of dynamic write command buffer and beat counter and modification of the command FIFO to include the beat count field. Additionally, modifications are made to device controller 60 to permit it to calculate write addresses based on the prior address. Nevertheless, these modifications and additions occupy minimal space. Since the size of the command FIFO 50 can be minimized, an overall savings in the size of the slave device chips can be achieved.

Although the present invention has been described with reference to preferred embodiments, workers skilled in the art will recognize that changes may be made in form and detail without departing from the spirit and scope of the invention.

What is claimed is:

1. An integrated circuit chip comprising a slave device for use in a data bus that transfers data between the slave device and at least one master device, wherein the slave
   an input receiving commands from the data bus, the commands including an associated write command received with each beat of write data of command including identification of a transaction to be performed;
   a register responsive to the identification of the transaction for selectively storing the corresponding command from the input, the register being controlled to store a single one of the write commands associated with the multiple-beat burst and not to store any other of the write commands associated with that multiple-beat burst; and
   a multiplexer coupled to the register and the input to selectively supply commands from the register or the input to a command device.

2. Apparatus according to claim 1, wherein the slave device further includes:
   a counter for counting the beats of the write data for the multiple-beat burst to be supplied to a device controlled by the device controller.

3. Apparatus according to claim 1, wherein the commands further include read commands, and the input is responsive to supply the read commands to the command device and is responsive to supply the write commands to the register.

4. Apparatus according to claim 3, wherein the slave device further includes:
   a counter for counting the beats of the write data for the multiple-beat burst to be supplied to a device controlled by the device controller.

5. Apparatus according to claim 4, wherein:
   the command device is a command FIFO that stores and issues commands for the device controller on a first-in, first-out basis,
   the slave device is responsive to a first of the write command associated with the multiple-beat burst to store the first write command to the register and is responsive to subsequent ones of the write commands associated with that multiple-beat burst to not store the subsequent write commands to the register, and
   the slave device operates the multiplexer to store the first write command and the beat count in the command FIFO upon receipt of a last beat of the write data associated with the multiple-beat burst.

6. Apparatus according to claim 5, wherein the device controller operates a peripheral device to receive data from the data bus, and the device controller calculates an address of the peripheral device for each write data beat following a first write data beat of the multi-beat burst based on an address of a prior beat of the write data in the burst and a size of the prior beat.

7. Apparatus according to claim 1, including:
   a control responsive to the input for operating the register to store write commands and to queue read commands following valid write commands.

8. Apparatus according to claim 7, wherein the transaction is selected from the group consisting of read and write transactions, and the input is responsive to a read command to supply the command to the command device and is responsive to a write command to supply the command to the register.

9. Apparatus according to claim 8, wherein the slave device further includes:
   a counter for counting the beats of the write data for the multiple-beat burst to be supplied to a device controlled by the device controller.

10. Apparatus according to claim 9, wherein:
    the command device is a command FIFO that stores and issues commands for the device controller on a first-in, first-out basis,
    the control is responsive to a first of the write command associated with the multiple-beat burst to store the first write command to the register and is responsive to subsequent ones of the write commands associated with that multiple-beat burst not to store the subsequent write commands to the register, and
    the slave device operates the multiplexer to store the first write command and the beat count in the command FIFO upon receipt of a last beat of the write data associated with the multiple-beat burst.

11. Apparatus according to claim 10, wherein the device controller operates a peripheral device to receive data from the data bus, the device controller calculating an address of the peripheral device for each write data beat following a first write data beat of the multiple-beat burst based on an address of a prior beat of the write data in the burst and a size of the prior beat.

12. A process of issuing commands to a command FIFO for execution by a data processing apparatus, the process comprising steps of:
    a) inputting multiple beats of write data for a multiple-beat burst to a slave device from a bus and storing each beat of the write data in a write data FIFO;
    b) inputting an associated write command to the slave device from the bus with each beat of the write data for the multiple-beat burst; and
    c) transferring at least one and less than all of the write commands associated with the multiple-beat burst to the command FIFO such that at least one other the write commands associated with the multiple-beat burst is blocked from being transferred to the command FIFO.

13. The process of claim 12, further including:

d) counting the beats of the write data received from the bus and associated with the multiple-beat burst, and wherein step c) includes storing a single one of the write commands that are associated with the multiple-beat burst in the command FIFO and storing the count in the command FIFO upon receipt of a last beat of the write data of the multiple-beat burst from the data bus.

14. The process of claim 13 and further including:

e) storing a first write command of a plurality of the write commands associated with the multiple-beat burst in a register and not storing any subsequent ones of the write commands associated with the multiple-beat burst in the register; and f) calculating an address for the data processing apparatus for each of the subsequent write commands associated with the miltiple-beat burst based on an address of a prior beat of the write data and a size of the beat.

15. The process of claim 12, further wherein step c) comprises:

storing a first of the write commands associated the multiple-beat burst in a register and not storing any subsequent ones of the write commands associated with the multiple-beat burst in the register; and transferring the first write command from the register to the command FIFO upon receipt of a last beat of the write data of the multiple-beat burst from the data bus.

16. In a data bus for conducting multi-beat transactions to transfer multiple data beats of a burst between a slave device and a master device, wherein the slave device feeds data processing apparatus to execute transactions on data bursts based on associated commands, wherein a command FIFO stores commands for execution by the data processing apparatus on a first-in, first-out basis, the improvement comprising:

a receiver for receiving read and write commands from the bus, the write commands including an associated write command received with each data beat of the burst;

a register for storing at least write commands from the receiver, the register being controlled to store a single one of the write commands associated with the multiple data beats of the burst and not to store any other of the write commands associated with that burst; and a multiplexer coupled to the register and the receiver to supply at least any of the write commands stored in the register to the command FIFO from the register and the read commands to the command FIFO from the receiver.

17. Apparatus according to claim 16, including:

a counter for counting the beats of the data for the burst to be supplied to the data processing apparatus.

18. Apparatus according to claim 17, wherein the slave device is responsive to a first of the write commands that are associated with the burst to store the first write command to the register and is responsive to subsequent write command following the first write command and not associated with the burst to store the subsequent write command to the register, and the slave device operates the multiplexer to store the first write command and the beat count in the command FIFO upon receipt of a last data beat of the burst.

19. Apparatus according to claim 18, wherein the data processing apparatus calculates an address for the data beats following a first data beat of a multi-beat transaction based on an address of a prior beat of that transaction and a size of the prior beat.

20. Apparatus according to claim 16, including:

a controller responsive to the receiver for operating the register to store write commands and to queue read commands following valid write commands.

* * * * *